United States Patent
Hudiono et al.

(10) Patent No.: US 8,270,107 B1
(45) Date of Patent: Sep. 18, 2012

(54) ACCUMULATOR FOR NON-RETURN TO ZERO (NRZ) LINEAR FEEDBACK SHIFT REGISTER (LFSR) IN CONTROLLER FOR DISK DRIVE

(75) Inventors: Lim Hudiono, Laguna Niguel, CA (US); Paul B. Ricci, Coto de Caza, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/246,960

(22) Filed: Sep. 28, 2011

Related U.S. Application Data

(63) Continuation of application No. 12/901,823, filed on Oct. 11, 2010, now Pat. No. 8,031,422, which is a continuation of application No. 12/031,627, filed on Feb. 14, 2008, now Pat. No. 7,813,067.

(60) Provisional application No. 60/889,829, filed on Feb. 14, 2007.

(51) Int. Cl.
*G11B 27/36* (2006.01)

(52) U.S. Cl. .......................................... 360/31

(58) Field of Classification Search .............. 360/31, 360/69, 55; 369/53.17; 714/54, 769
See application file for complete search history.

(56) References Cited

U.S. PATENT DOCUMENTS

| | | | |
|---|---|---|---|
| 4,201,908 A | 5/1980 | Johnson et al. | |
| 4,229,796 A | 10/1980 | Garrett | |
| 4,348,761 A * | 9/1982 | Berger | 714/718 |
| 4,380,029 A | 4/1983 | Bode | |
| 4,835,757 A * | 5/1989 | Abiko | 369/53.17 |
| 5,602,857 A * | 2/1997 | Zook et al. | 714/769 |
| 5,631,913 A | 5/1997 | Maeda | |
| 6,125,469 A * | 9/2000 | Zook et al. | 714/769 |
| 6,128,755 A | 10/2000 | Bello et al. | |
| 6,751,757 B2 * | 6/2004 | Biskup et al. | 714/54 |
| 6,978,370 B1 | 12/2005 | Kocher | |
| 7,392,425 B1 * | 6/2008 | Schoenthal et al. | 714/6.32 |
| 7,477,466 B2 | 1/2009 | Yoshida et al. | |
| 8,068,390 B2 * | 11/2011 | Al | 369/47.14 |
| 2003/0067699 A1 | 4/2003 | Thomson et al. | |
| 2004/0125868 A1 | 7/2004 | Keller et al. | |
| 2005/0076225 A1 * | 4/2005 | Talstra et al. | 713/187 |
| 2007/0047120 A1 | 3/2007 | DeGroat | |
| 2007/0116280 A1 * | 5/2007 | Takashima | 380/228 |
| 2007/0168814 A1 | 7/2007 | Leininger et al. | |
| 2007/0192656 A1 | 8/2007 | Goessel et al. | |
| 2007/0263313 A1 | 11/2007 | Kitamura et al. | |
| 2008/0151618 A1 | 6/2008 | Sharon et al. | |
| 2008/0208374 A1 * | 8/2008 | Grgic et al. | 700/83 |
| 2008/0215798 A1 | 9/2008 | Sharon et al. | |

* cited by examiner

*Primary Examiner* — Fred Tzeng

(57) ABSTRACT

A disk controller for a hard disk drive includes a disk formatter interfaced via an NRZ bus to a read channel for the disk. The disk formatter includes an LFSR accumulator coupled to the NRZ bus, as well as an LSFR generator that generates synthetic test data for the disk formatter. Under control of a test flag which signifies a test mode, the LSFR generator generates synthetic test data, which is used by the disk formatter to drive the NRZ bus. The LSFR accumulator accumulates data on the NRZ bus, together with data on servo information and sector information. An interface is provided through which the accumulated information is provided to test equipment, for offline analysis of the accumulated information, so as to confirm proper operation of the disk subsystem and/or to detect failures therein.

16 Claims, 9 Drawing Sheets

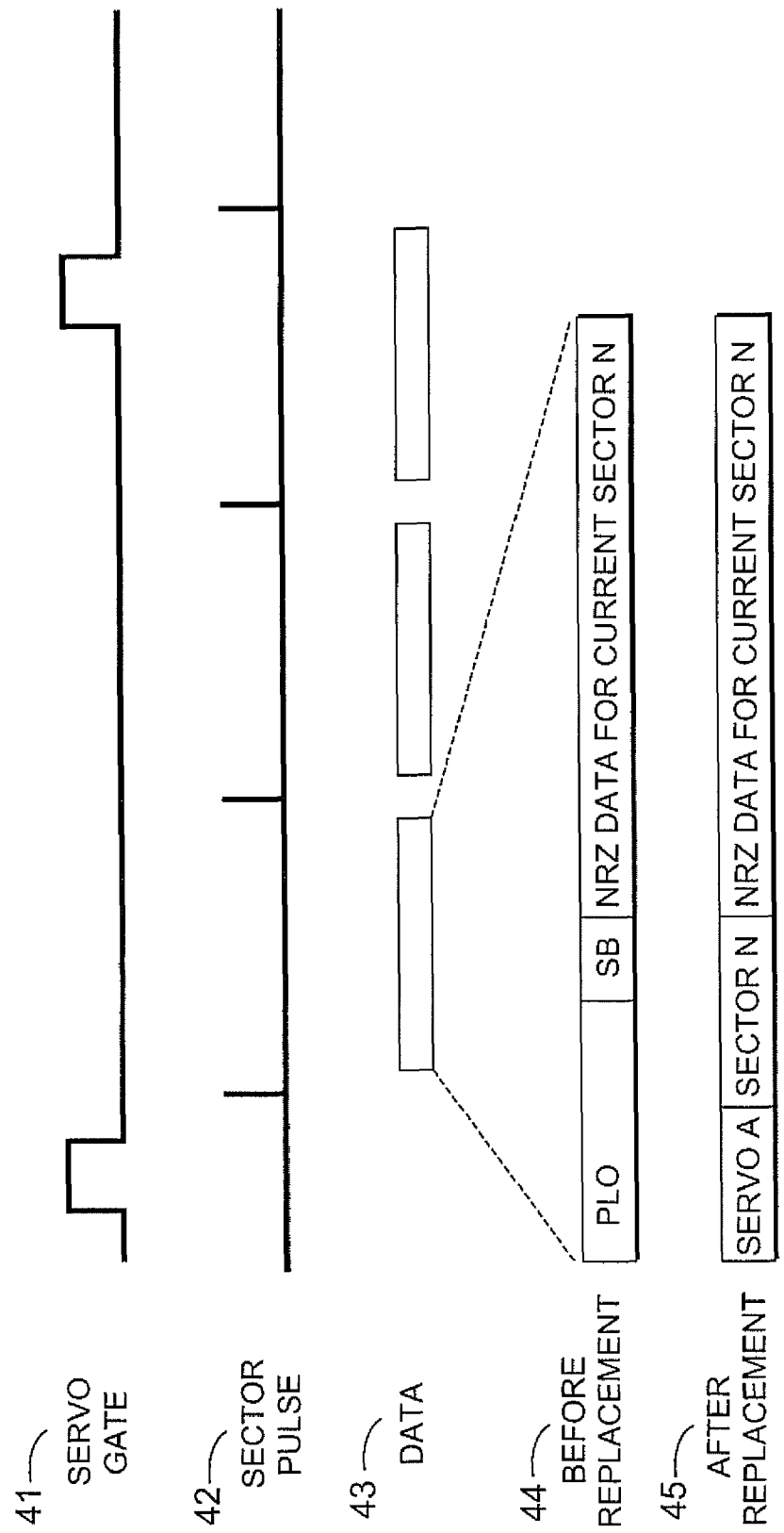

ACCUMULATOR FOR NON-RETURN TO ZERO (NRZ) LINEAR FEEDBACK SHIFT REGISTER (LFSR) IN CONTROLLER FOR DISK DRIVE

CROSS-REFERENCE TO RELATED APPLICATION

This application is a Continuation of U.S. application Ser. No. 12/901,823, filed Oct. 11, 2010, which claims priority to U.S. application Ser. No. 12/031,627, filed Feb. 14, 2008, now U.S. Pat. No. 7,813,067, issued Oct. 12, 2010, which claims priority under 35 U.S.C. §119(e) to U.S. Provisional Application No. 60/889,829, filed Feb. 14, 2007. The disclosures of the applications referenced above are incorporated herein by reference.

FIELD

The present invention relates to a controller for a hard disk drive, and more particularly relates to testing and confirmation of the proper operation of a disk formatter circuit.

BACKGROUND

Controllers for current disk drives often include a disk formatter circuit that interfaces to read channel circuitry via a non-return to zero (NRZ) bus. More specifically, the disk formatter circuitry performs both data path and control path operations, and typically receives timing information and data so as to control a sequence of read or write operations. The read channel circuitry is responsible for actual reading of data from the physical disk medium, and the writing of data thereto. The read channel circuitry and the disk formatter circuit interface with each other via the NRZ bus, which often has a bit depth of 10 bits.

With increasing performance of the hard disk drive, both in terms of speed of data transfer to and from a host as well as storage capacity and density, there is a corresponding increase on the performance demands of the NRZ bus and the disk formatter circuit. Testing is performed to confirm proper operation. Testing may be performed at manufacture time or at any time before or during deployment of the hard disk drive in actual service. However, these increases in performance also make it more difficult to perform testing accurately, since the test equipment itself might not have performance capabilities that are sufficient to detect and report on disk subsystem failures, or to confirm that these subsystems are performing correctly.

SUMMARY

The foregoing situation is addressed through the provision of a disk formatter with a linear feedback shift register (LFSR) accumulator, which accumulates data from the NRZ bus, together with data on disk servo information and sector information. The accumulated data can thereafter be provided to test circuitry, for offline analysis to confirm proper operation of the disk subsystem or to detect failures in the disk subsystem.

In an example embodiment of the invention, a hard disk drive includes a disk controller having a disk formatter that interfaces via an NRZ bus to a read channel for the disk. The disk formatter includes an LFSR accumulator coupled to the NRZ bus. Under control of a test flag that signifies a test mode, the LFSR accumulator accumulates data on the NRZ bus together with data on servo information and sector information. An interface is provided through which information accumulated in the LFSR accumulator is provided to test equipment. The test equipment performs offline analysis of the accumulated information, to confirm proper operation of the disk subsystem, or to detect failures in it.

In further example embodiments, the disk formatter may include an LFSR generator that generates synthetic test data for the disk formatter. Under control of the test flag, the generated synthetic data is used by the disk formatter in lieu of, or in combination with, actual data such as that which might be stored in cache memory of the disk drive controller.

This brief summary has been provided so that the nature of the disclosure may be understood quickly. A more complete understanding can be obtained by reference to the following detailed description and to the attached drawings.

BRIEF DESCRIPTION OF THE DRAWINGS

FIG. 5 is a timing chart showing data accumulated by the LFSR accumulator shown in FIG. 4, together with a depiction of the data accumulated and replaced by the LFSR accumulator.

DETAILED DESCRIPTION

Figure 1:
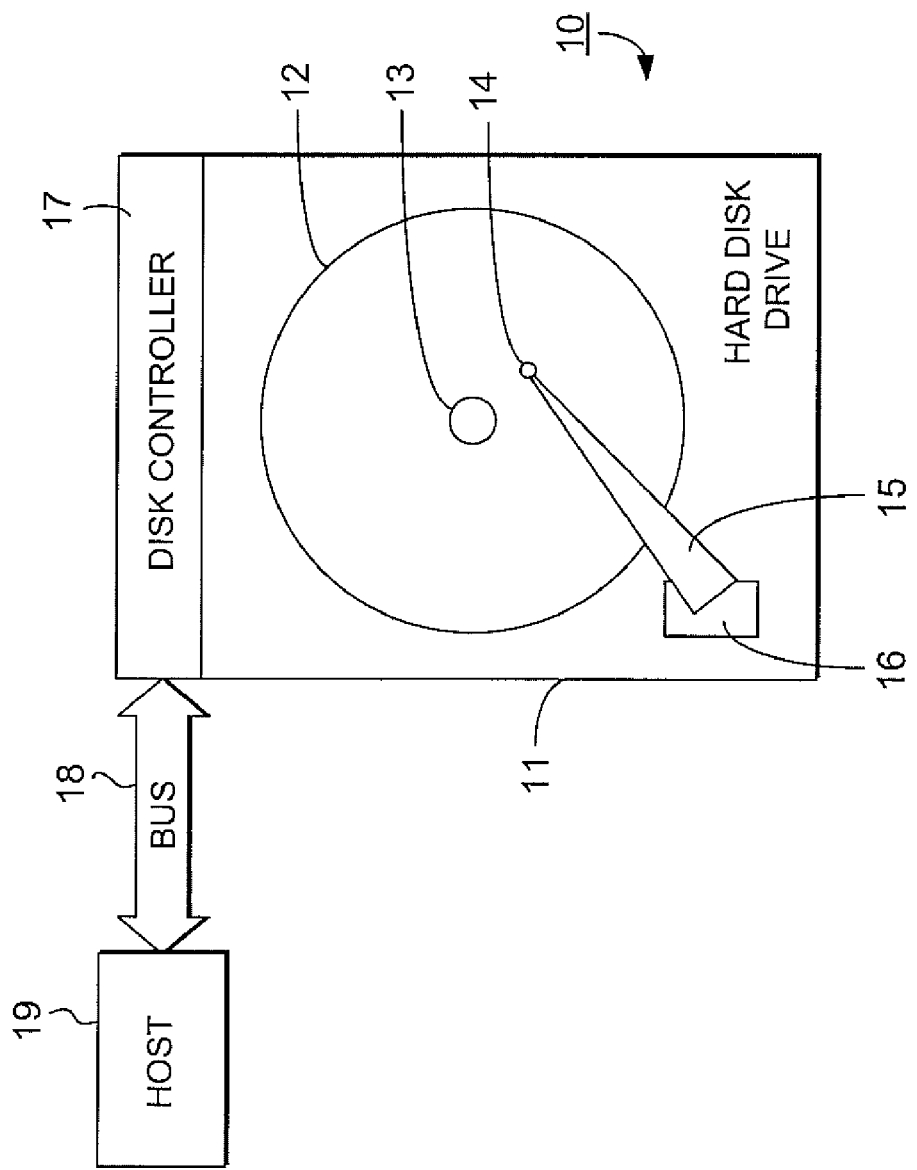
FIG. 1 is a representational view of a hard disk drive according to an example embodiment of the invention.

FIG. 1 is a representational view of a hard disk drive 10 according to an example embodiment of the invention. Mechanically, hard disk drive 10 includes housing 11 which houses physical storage medium 12, which in this embodiment is a platter coated with a magnetic material and rotatable about spindle 13 by an unshown drive motor. A read/write head 14 is mounted to arm 15 for movement of the read/write head across the surface of medium 12 under control of actuator 16.

Hard disk drive 10 further includes disk controller 17 which generally includes a processor such as a digital signal processor, a microprocessor, microcontroller, or the like, for executing instructions stored in memory for electrical and mechanical control of the hard disk drive components. Disk controller 17 includes an interface via bus 18 to a host 19. Host 19 might be a personal computer such as a laptop or desktop, or it might be an embedded device such as a handheld PDA or music player. Other examples of host device 19 are given in connection with FIGS. 6A through 6H, below.

Bus 18 might be an EIDE interface bus, an ATA or serial ATA (SATA) interface bus, a fibre channel (FC), or Serial Attached SCSI (SAS) interface, although it will be understood that other buses and interfaces might be used.

Figure 2:
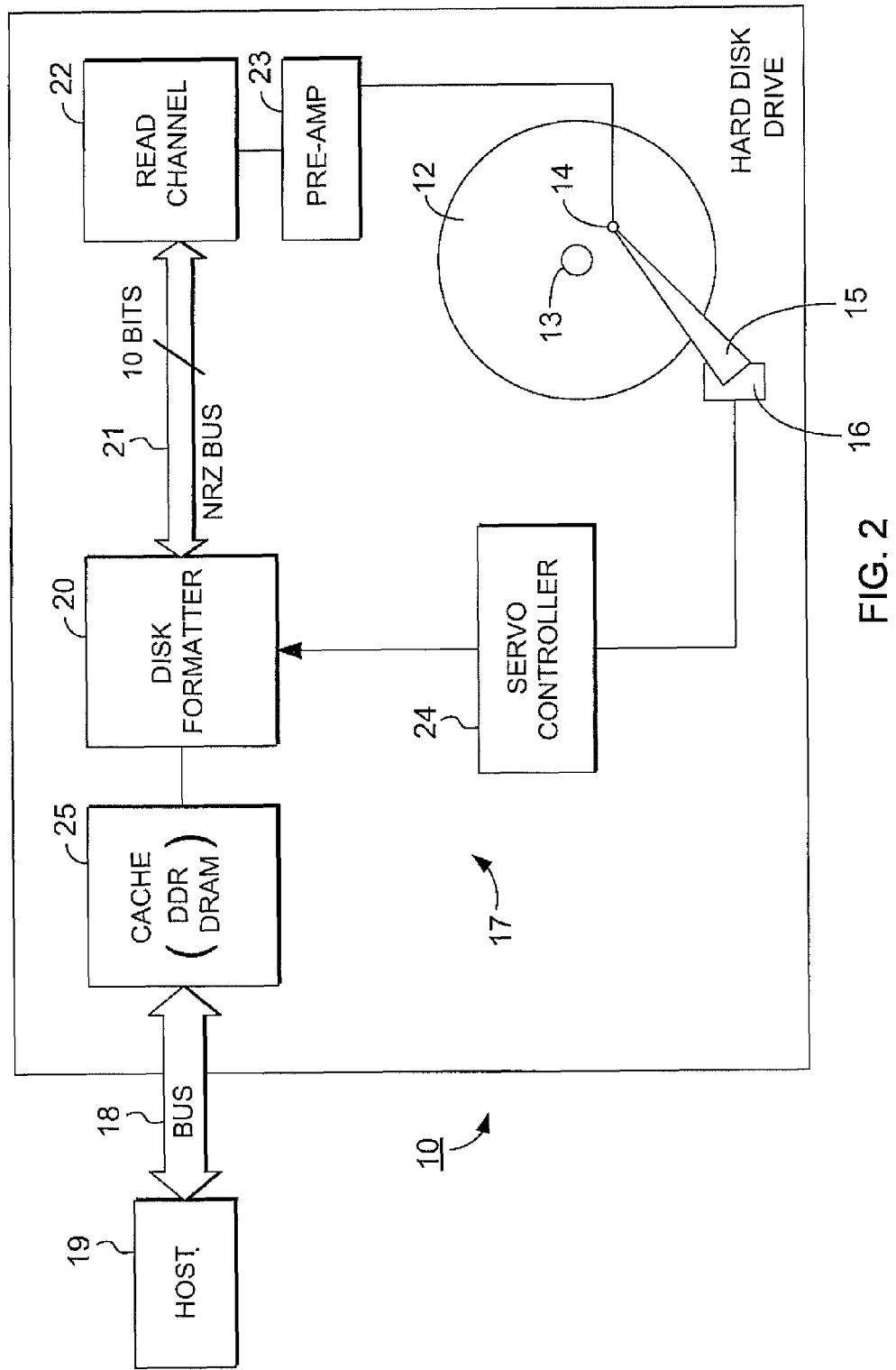
FIG. 2 is a block diagram showing more details of a disk controller in the embodiment of FIG. 1.

FIG. 2 is a block diagram showing more details relative to disk controller 17. As seen in FIG. 2, disk controller 17 includes disk formatter circuit 20, which interfaces via an NRZ bus 21 to read channel circuitry 22. In this example embodiment, NRZ bus 21 is a 10-bit wide bus. Read channel circuitry 22 performs read and write access to the surface of physical medium 12 via read/write head 14, for which the signal is pre-amplified by preamplifier 23. Actuator 16 is driven by servo controller 24, under control of disk formatter 20. For a disk write operation, disk formatter 20 reads data provided in cache memory 25 for read channel 22 to the surface of physical medium 12. For a disk read operation, disk formatter 20 obtains data read by read channel 22 from the surface of physical medium 12 and stores it into cache memory 25. Cache memory 25 may be implemented by double data rate synchronous dynamic random access memory (DDR DRAM).

Figure 3:
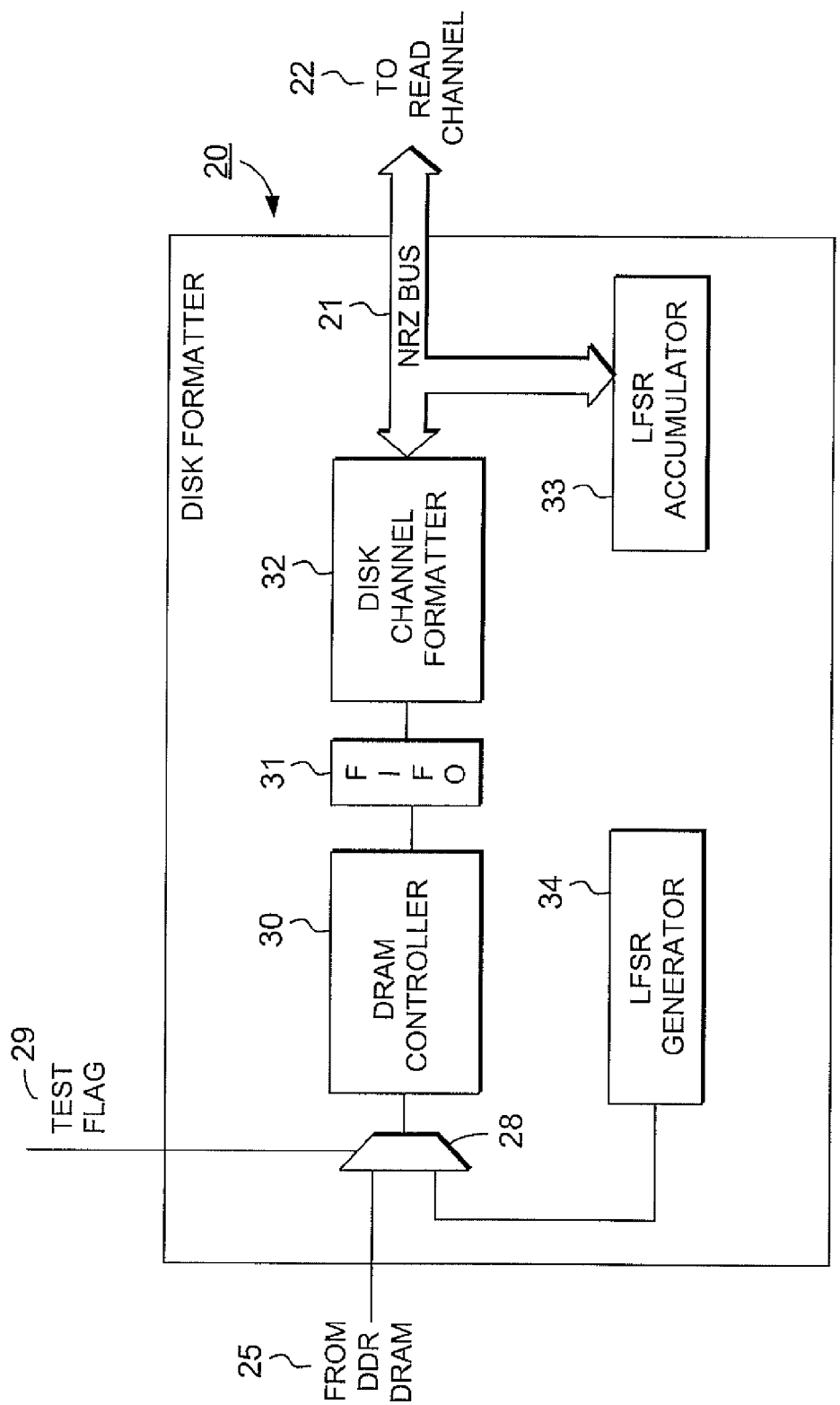
FIG. 3 is a block diagram showing the construction of a disk formatter according to the embodiment of FIG. 1.

FIG. 3 is a detailed block diagram showing construction of disk formatter 20, according to this example embodiment of the invention. As shown in FIG. 3, disk formatter 20 includes a multiplexer 28 that operates under control of test flag 29, which signifies a testing mode. When test flag 29 signifies a non-test mode, multiplexer 28 selects data from cache memory 25, under control of DRAM controller 30, and provides the selected data to FIFO 31. A disk channel formatter 32 sends a signal to read channel circuitry 22 via NRZ bus 21, to allow read channel circuitry 22 to write the data onto the surface of physical medium 12.

Disk formatter 20 further includes an LFSR accumulator 33, which is coupled to NRZ bus 21. Under control of test flag 29, LFSR accumulator 33 accumulates data on NRZ bus 21, together with other data including servo and sector information as discussed below in connection with FIGS. 4 and 5.

Disk formatter 20 further includes LFSR generator 34 for generating synthetic test data. LFSR generator 34 may be implemented as part of DRAM controller 30, if desired. The output of LFSR generator 34 is selected by multiplexer 28 under control of test flag 29, when test flag 29 signifies a test mode. In the test mode, the synthetic data generated by LFSR generator 34 is provided to FIFO 31 under control of DRAM controller 30. This allows the functionality of disk formatter 20 to be tested with simulated data rather than with actual data stored in cache memory 25.

Figure 4:
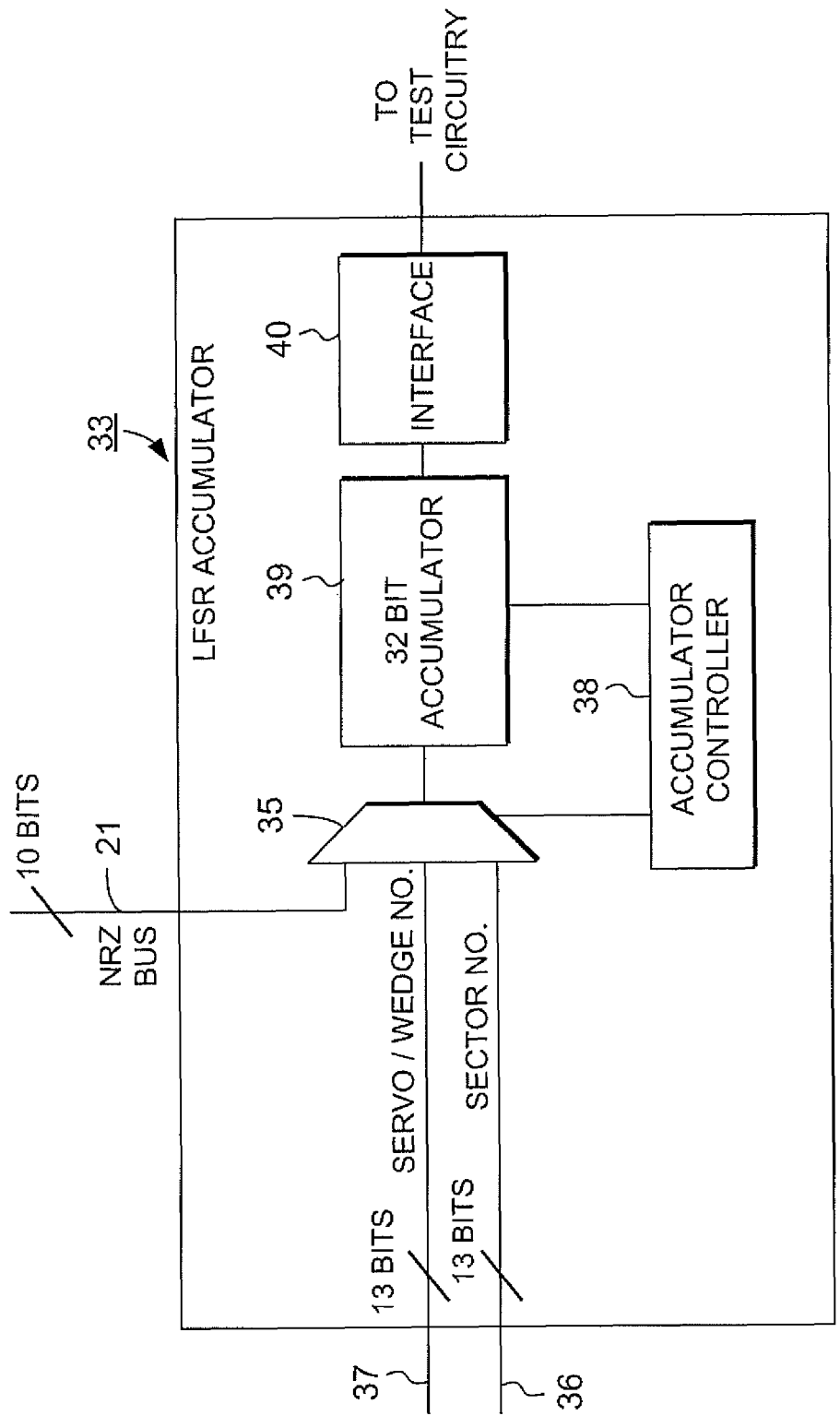
FIG. 4 is a block diagram showing the construction of an LFSR accumulator according to the embodiment of FIG. 1.

FIG. 4 is a detailed block diagram showing construction of LFSR accumulator 33 according to this example embodiment. As shown in FIG. 4, LFSR accumulator 33 includes multiplexer 35 that accepts 10 bits of data from NRZ bus 21. Additionally, multiplexer 35 is provided with data corresponding to sector number information 36 and servo/wedge number information 37. The sector information 36 and servo information 37 are provided from servo controller 24 (see FIG. 2). In this implementation, each of these is 13 bits wide. However, in other implementations, the bit width of servo information 37 and sector information 36 can be different, larger or smaller and/or different from each other, so long as the total bit count for the servo information 37 and sector information 36 is not greater than the total bit count of phase lock loop oscillator (PLO) information and synch byte information, as explained below in connection with replacement of accumulated data.

Under control of accumulator controller 38, multiplexer 35 serves 10- and 13-bit information into 32-bit accumulator 39. The information is time-wise accumulated, during a test mode signified during test flag 29, for a pre-designated test period during which LFSR generator 34 generates synthetic test data. After accumulation, 32 bit accumulator 39 provides the accumulated information via interface 40 for offline testing analysis, which confirms proper operation of the disk subsystem, and/or which detects failures in the disk subsystem.

In other implementations, the bit width of accumulator 39 can be changed by expanding to accumulate wider data or by diminishing to accumulate narrower data. In addition, the depth of accumulator 39 can be deepened or made more shallow so as to accumulate longer/more data or shorter/less data.

Interface 40 may be a dedicated interface, in the sense that it is used only for the transmission of accumulated test data to off-line testing circuitry, or it may be an interface shared with other components for other purposes. For example, interface 40 may be implemented in shared fashion with interface 18 to host 19, in which case host 19 may perform the off-line analysis. As another example, the DSP of disk controller 17 might be provided with sufficient computational power to perform the analysis internally of the disk drive, such as in embodiments where the DSP is implemented as a microprocessor or a microprocessor/DSP pair. In such embodiments where there is sufficient computational power in the disk drive itself, interface 40 may be a dedicated interface to the DSP of disk controller 17, in which case the off-line analysis is performed internally of the disk drive, by disk controller 17.

FIG. 5 is a timing diagram showing a representative example by which data is accumulated in LFSR accumulator 33, according to this example embodiment of the invention. Servo gate pulses 41 and sector pulses 42 are generated by servo controller 24 (see FIG. 2) and provide timing signals to disk formatter 20. Based on the servo gate pulses 41, servo information 37 is generated, and based on sector pulse 42, sector information 36 is generated. In the interval between sector pulses 42, data 43 is accumulated into LFSR accumulator 33, and specifically is accumulated into accumulator 39.

As further shown in FIG. 5, accumulator controller 38 controls multiplexer 35 so as to effect replacements of accumulated data. Reference numeral 44 shows data before replacement, and reference numeral 45 shows data after replacement. Before replacement, information available to LFSR accumulator 33 includes phase lock loop oscillator information (PLO), synch byte information, and actual NRZ data appearing on NRZ bus 21 for current sector N. Under control from accumulator controller 38, multiplexer 35 operates to effect replacements in this data. After replacement, PLO data and the synch byte data are both replaced with data for servo information 37 and sector information 36. This information may be truncated, from its original bit-width of 13 bits down to a smaller bit width, so as to fit together with the 10-bit width of NRZ data 21 inside 32-bit accumulator 39.

For example, the 13 bit servo information 37 may be split into 10 bits and 3 bits. The 13 bit sector information may also be split into 10 bits and 3 bits. Accumulator controller 38 combines the 3 bits from the servo information 37, the 3 bits from the sector information 36, and 4 bits of 0 as padding. Accumulator controller 38 provides the 32-bit accumulator 39 with the 10 bit servo information, the 10 bit sector information, the combined 3 bit servo and sector information, and the data for sector n. This technique of bit-splitting can also be used to accumulate more information that is related to the sector, for example, the disk track number and servo counting status.

In operation, a test is commenced by setting the test flag 29 to test mode, which thereupon causes LSFR generator 34 to generate synthetic test data. Processing of the synthetic test data by disk channel formatter 32, based on data appearing on NRZ bus 21, is thereafter accumulated into LSFR accumulator 33, during a pre-designated testing period. The accumulated data is thereafter accessed via interface 40 by testing equipment, which performs offline analysis to confirm proper operation of the disk subsystem, and/or to detect failure therein. The testing may be performed at manufacture time, based on which manufactured devices can be accepted or rejected for shipment to end users. In addition, testing can be performed in actual deployment in the field, such as a test at each time that the disk drive is powered up. Such an arrangement allows for on-board testing. In addition, since the test data is accumulated in LFSR accumulator 33, for offline analysis after the pre-designated testing period, testing can be accomplished ordinarily without the need for expensive test equipment that must somehow match the speed and performance increases in the disk controller itself.

Figure 6A:
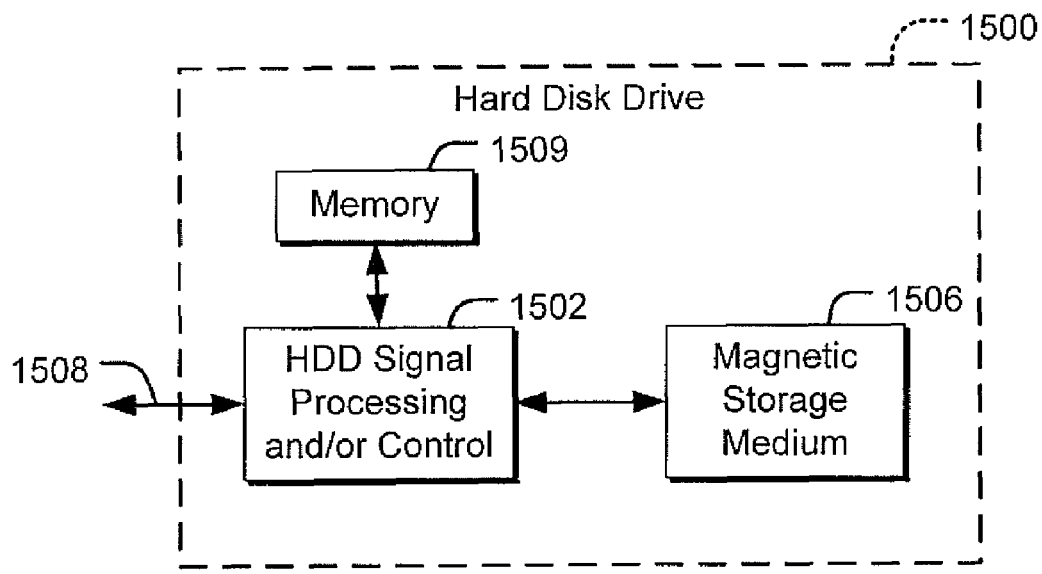
FIG. 6A is a block diagram showing an example embodiment in a hard disk drive system.

Referring now to FIGS. 6A through 6H, various exemplary implementations of the present invention are shown. Referring to FIG. 6A, the present invention may be embodied as a disk drive or disk drive controller in a hard disk drive system 1500. The present invention may implement either or both signal processing and/or control circuits, which are generally identified in FIG. 6A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 6B:
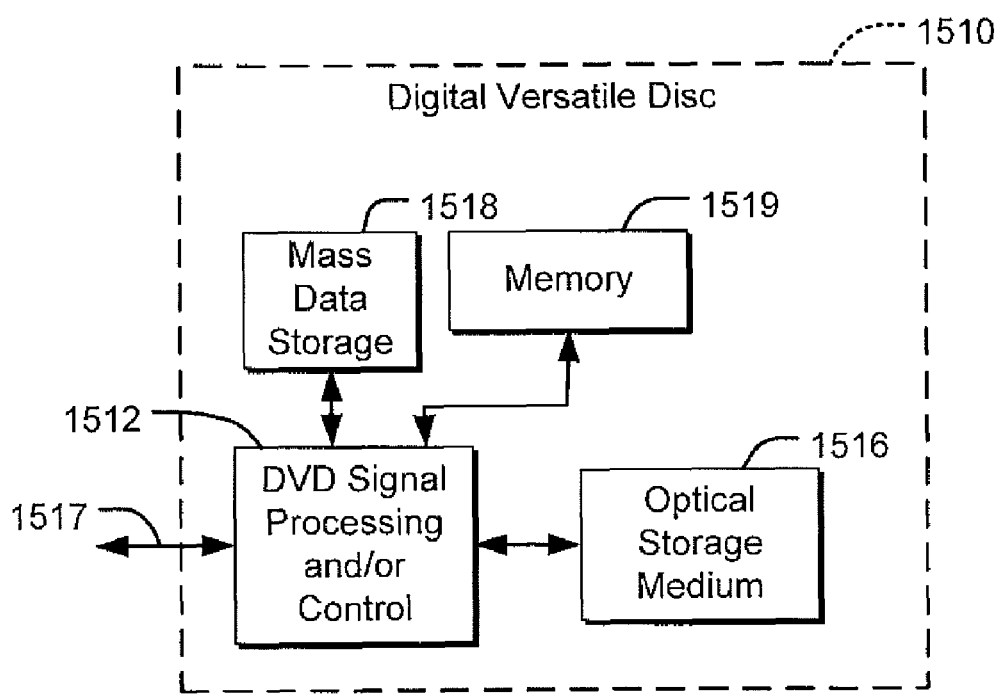
FIG. 6B is a block diagram of an example embodiment in a DVD drive.

Referring now to FIG. 6B, the present invention may be embodied as a disk drive or disk drive controller in a digital versatile disc (DVD) drive 1510. The present invention may implement either or both signal processing and/or control circuits, which are generally identified in FIG. 6B at 1512, and/or mass data storage 1518 of DVD drive 1510. Signal processing and/or control circuit 1512 and/or other circuits (not shown) in DVD 1510 may process data, perform coding and/or encryption, perform calculations, and/or format data that is read from and/or data written to an optical storage medium 1516. In some implementations, signal processing and/or control circuit 1512 and/or other circuits (not shown) in DVD 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD 1510 may communicate with mass data storage 1518 that stores data in a nonvolatile manner. Mass data storage 1518 may include a hard disk drive (HDD) such as that shown in FIG. 6A. The HDD may be a mini HDD that includes one or more platters having a diameter that is smaller than approximately 1.8". DVD 1510 may be connected to memory 1519, such as RAM, ROM, low latency nonvolatile memory such as flash memory, and/or other suitable electronic data storage.

Figure 6C:
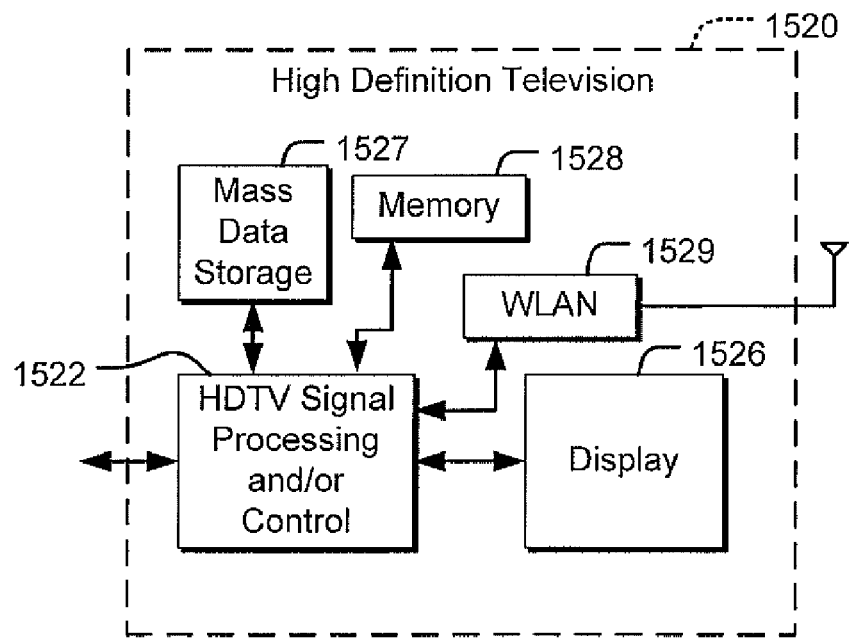
FIG. 6C is a block diagram of an example embodiment in a high definition television (HDTV).

Referring now to FIG. 6C, the present invention may be embodied as a disk drive or disk drive controller in a high definition television (HDTV) 1520. The present invention may implement either or both signal processing and/or control circuits, which are generally identified in FIG. 6C at 1522, a WLAN interface and/or mass data storage of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perforin calculations, format data and/or perform any other type of HDTV processing that may be required.

HDTV 1520 may communicate with mass data storage 1527 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via a WLAN network interface 1529.

Figure 6D:
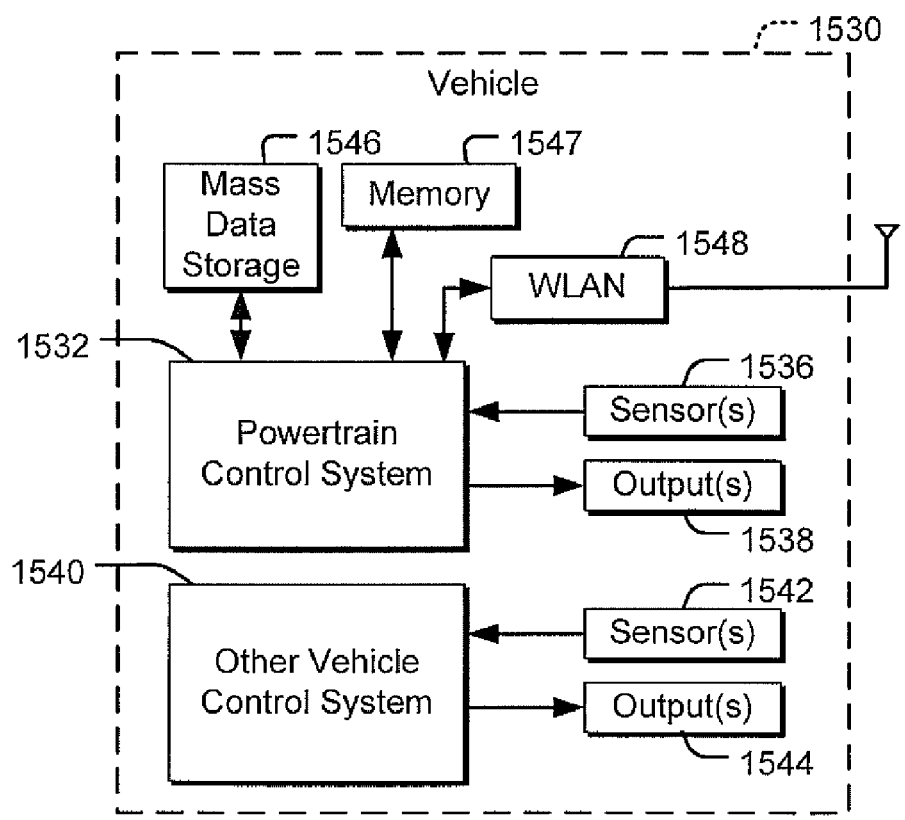
FIG. 6D is a block diagram of an example embodiment in a vehicle control system.

Referring now to FIG. 6D, the present invention may be embodied as a disk drive or disk drive controller in a control system of a vehicle 1530, a WLAN interface and/or mass data storage of the vehicle control system. In some implementations, the present invention implements a powertrain control system 1532 that receives inputs from one or more sensors 1536 such as temperature sensors, pressure sensors, rotational sensors, airflow sensors and/or any other suitable sensors and/or that generates one or more output control signals 1538 such as engine operating parameters, transmission operating parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via a WLAN network interface 1548. The control system 1540 may also include mass data storage, memory and/or a WLAN interface (all not shown).

Figure 6E:
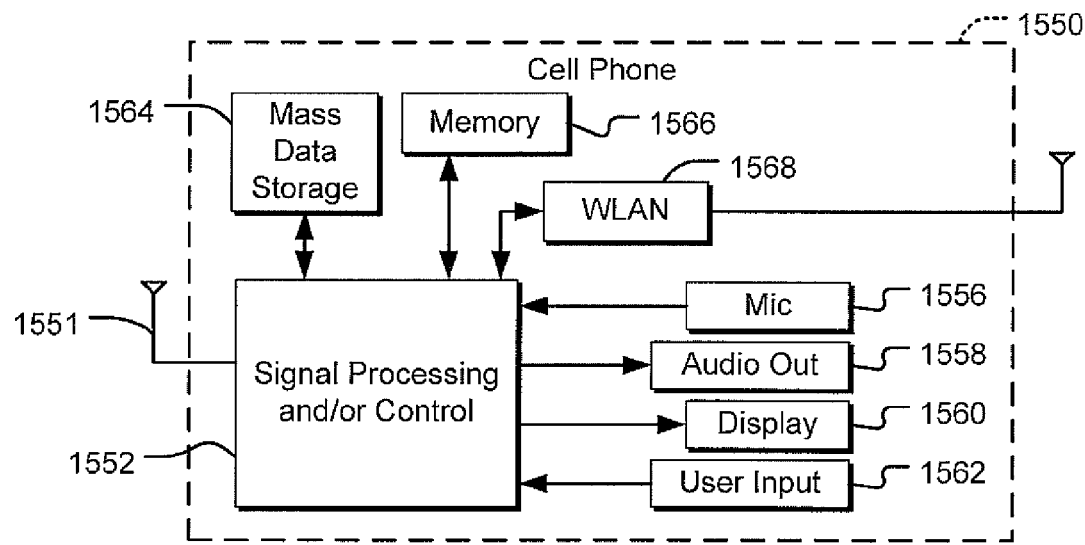
FIG. 6E is a block diagram of an example embodiment in a cellular or mobile phone.

Referring now to FIG. 6E, the present invention may be embodied as a disk drive or disk drive controller in a cellular phone 1550 that may include a cellular antenna 1551. The present invention may implement either or both signal processing and/or control circuits, which are generally identified in FIG. 6E at 1552, a WLAN interface and/or mass data storage of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via a WLAN network interface 1568.

Figure 6F:
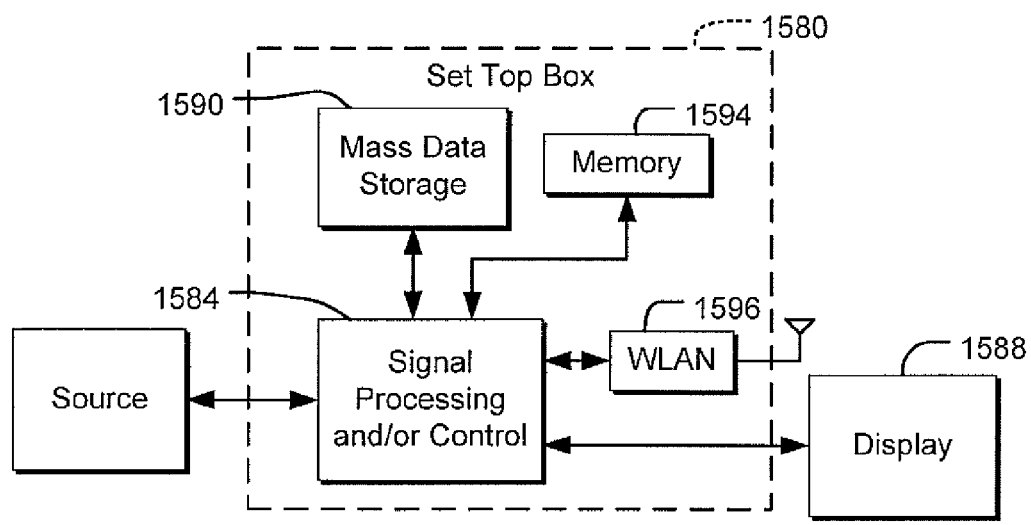
FIG. 6F is a block diagram of an example embodiment in a set-top box (STB).

Referring now to FIG. 6F, the present invention may be embodied as a disk drive or disk drive controller in a set top box 1580. The present invention may implement either or both signal processing and/or control circuits, which are generally identified in FIG. 6F at 1584, a WLAN interface and/or mass data storage of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via a WLAN network interface 1596.

Figure 6G:
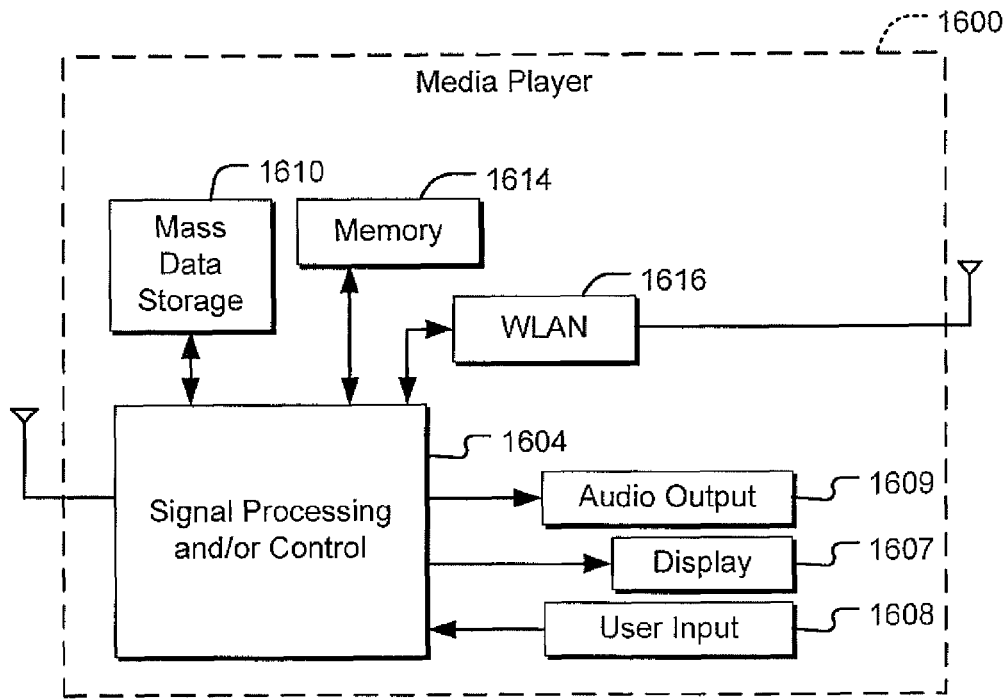
FIG. 6G is a block diagram of an example embodiment in a media player.

Referring now to FIG. 6G, the present invention may be embodied as a disk drive or disk drive controller in a media player 1600. The present invention may implement either or both signal processing and/or control circuits, which are generally identified in FIG. 6G at 1604, a WLAN interface and/or mass data storage of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via a WLAN network interface 1616. Still other implementations in addition to those described above are contemplated.

Figure 6H:
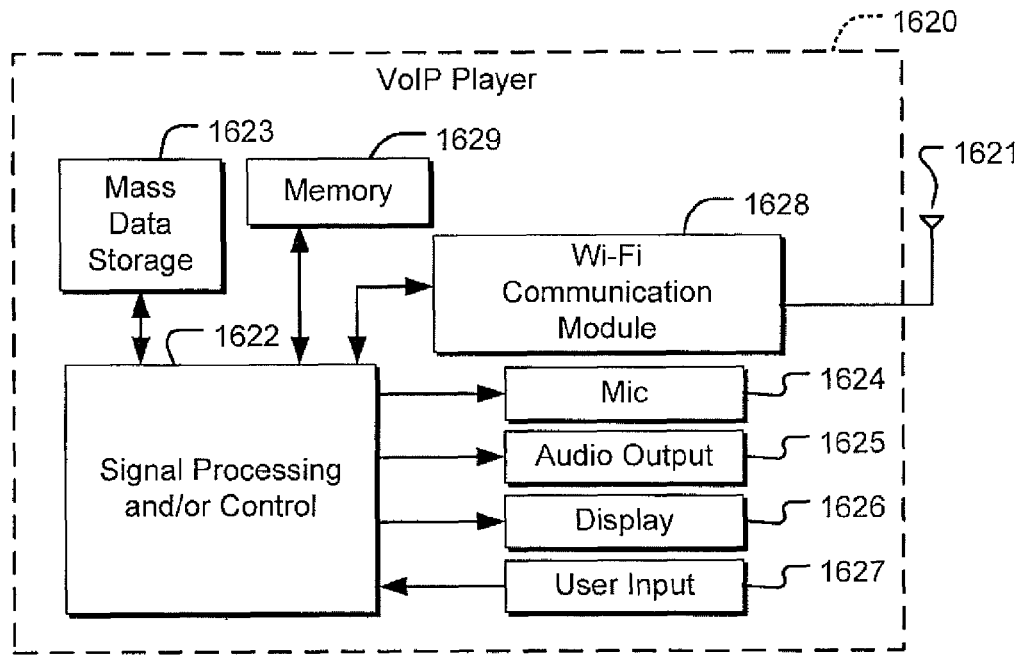
FIG. 6H is a block diagram of an example embodiment in a Voice-over Internet Protocol (VoIP) player.

Referring to FIG. 6H, the present invention may be embodied as a disk drive or disk drive controller in a Voice over Internet Protocol (VoIP) player 1620 that may include an antenna 1621. The present invention may implement either or both signal processing and/or control circuits, which are generally identified in FIG. 6H at 1622, a wireless interface and/or mass data storage of the VoIP player 1623. In some implementations, VoIP player 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP player 1620 may process data, perform coding and/or encryption, perform calculations, format data and/or perform other VoIP player functions.

VoIP player 1620 may communicate with mass data storage 1623 that stores data in a nonvolatile manner such as optical and/or magnetic storage devices, for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". VoIP player 1620 may be connected to memory 1629, which may be a RAM, ROM, low latency nonvolatile memory such as flash memory and/or other suitable electronic data storage. VoIP player 1620 is configured to establish communications link with a VoIP network (not shown) via Wi-Fi communication module 1628.

Example aspects of the present disclosure have been described above with respect to particular illustrative example embodiments. It is understood that the disclosure is not limited to the above-described example embodiments and that various changes and modifications may be made by those skilled in the relevant art without departing from the spirit and scope of the disclosure.

What is claimed is:
1. A disk controller comprising:
   a disk formatter including
      a generator configured to generate test data during a test mode, and an accumulator configured to, during the test mode, (i) receive the test data, (ii) replace part of the test data to generate replaced test data, and (iii) accumulate the replaced test data, wherein the accumulator comprises a multiplexer configured to selectively replace part of the test data with (i) servo information and (ii) sector information.

2. The disk controller of claim 1, further comprising:
a memory configured to store data to be written onto a physical medium of a hard disk drive.

3. The disk controller of claim 2, wherein:
in response to the disk formatter operating in a non-test mode, the disk formatter is configured to control a first sequence of operations for writing the data stored in the memory onto the physical medium of the hard disk drive; and
in response to the disk formatter operating in the test mode, the accumulator is configured to accumulate the replaced test data to test the first sequence of operations.

4. The disk controller of claim 1, wherein the disk formatter is configured to operate in the test mode responsive to a test flag.

5. The disk controller of claim 1, wherein the accumulator is further configured to transmit the accumulated replaced test data to test equipment to enable the test equipment to use the accumulated replaced test data to test a hard disk drive.

6. The disk controller of claim 1, wherein the accumulator comprises a linear feedback shift register (LFSR) accumulator.

7. A hard disk drive comprising the disk controller of claim 1.

8. A device comprising the hard disk drive of claim 7.

9. The device of claim 8, wherein the device comprises one of a high definition television, a control system of a vehicle, a cellular phone, a set top box, or a media player.

10. A method of operating a disk controller, the method comprising:
generating test data;
replacing part of the test data to generate replaced test data;
accumulating the replaced test data to generate accumulated replaced test data; and
using the accumulated replaced test data to test a hard disk drive,
wherein the part of the test data is replaced by corresponding (i) servo information and (ii) sector information.

11. The method of claim 10, further comprising:
during a non-test mode, controlling, by a disk formatter, a sequence of operations for writing data stored in a memory onto a physical medium of a hard disk drive,
wherein using the accumulated replaced test data further comprises using the accumulated replaced test data to test the sequence of operations.

12. The method of claim 10, further comprising:
operating the disk controller in (i) a test mode and (ii) a non-test mode.

13. The method of claim 12, further comprising:
performing, during the test mode, the generating, the replacing, and the accumulating.

14. The method of claim 10, further comprising:
selecting, during a non-test mode, data from a memory for writing onto a physical medium of the hard disk drive; and
selecting, during a test mode, the generated test data.

15. The method of claim 14, further comprising:
generating a test flag that indicates whether a disk controller operates in the test mode or the non-test mode,
wherein the selecting the data from the memory and the selecting the generated test data are based on the test flag.

16. A method of operating a disk controller, the method comprising:
generating test data;
replacing part of the test data to generate replaced test data;
accumulating the replaced test data to generate accumulated replaced test data; and
using the accumulated replaced test data to test a hard disk drive,
wherein replacing part of the test data further comprises replacing (i) phase locked loop information of the test data and (ii) synch byte information of the test data.

* * * * *